R. S. FARNSWORTH.
STEERING ATTACHMENT FOR TRACTORS.
APPLICATION FILED NOV. 25, 1919.
1,354,036.
Patented Sept. 28, 1920.
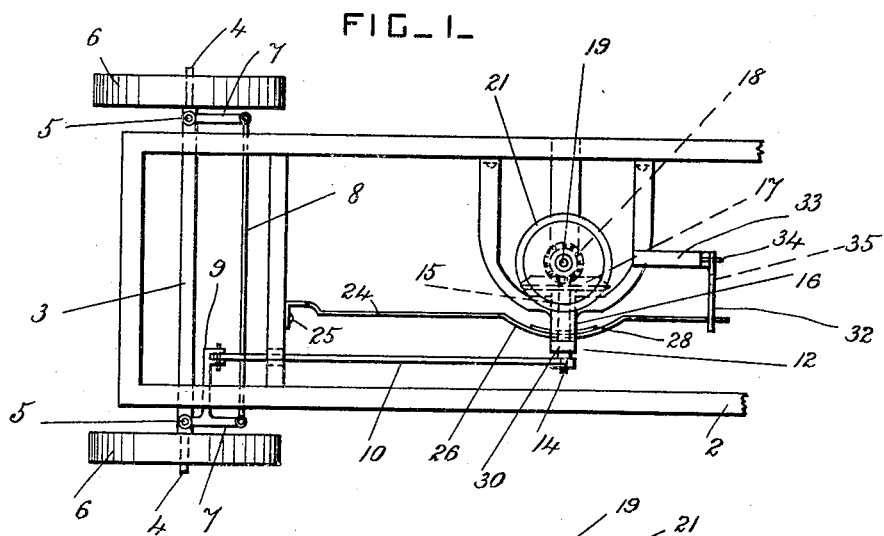
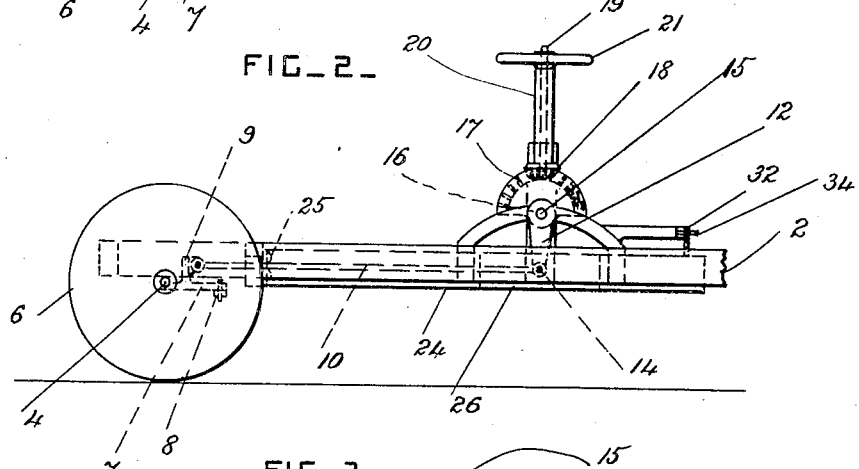
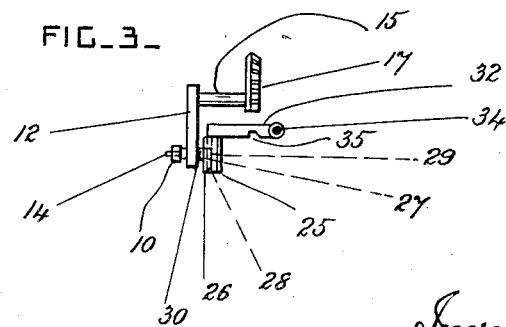
Inventor.
Ralph S. Farnsworth
by Herbert W. Jenner.
Attorney.

UNITED STATES PATENT OFFICE.

RALPH S. FARNSWORTH, OF LODA, ILLINOIS.

STEERING ATTACHMENT FOR TRACTORS.

1,354,036.                Specification of Letters Patent.     Patented Sept. 28, 1920.

Application filed November 25, 1919. Serial No. 340,515.

*To all whom it may concern:*

Be it known that I, RALPH S. FARNSWORTH, a citizen of the United States, residing at Loda, in the county of Iroquois and State of Illinois, have invented certain new and useful Improvements in Steering Attachments for Tractors, of which the following is a specification.

This invention relates to steering attachments for motor cars, and more particularly for tractors as used for plowing; and it consists in the novel construction and combination of the parts hereinafter fully described and claimed, whereby the front or steering ground wheels are held in a certain preferred position until released at the will of the operator.

In the drawings, Figure 1 is a plan view of portions of a tractor provided with a steering attachment according to this invention. Fig. 2 is a side view of the attachment. Fig. 3 is a detail view of the catch for holding the spring plate out of action.

The tractor is provided with a frame 2, and a front axle 3 having axle spindles 4 pivoted to it by pins 5, and 6 are the steering ground wheels mounted on the axle spindles 4. The axle spindles have arms 7 which are pivotally coupled together by a connecting-rod 8, and one of the arms 7 has a laterally projecting arm 9 to which the steering rod 10 is pivoted. These parts are all of approved construction.

The rear end portion of the steering rod 10 is connected to the lower end of a crank 12 by a pin 14, and the crank 12 works in a vertical plane and is secured to a crank shaft 15 which is mounted in a bearing 16 on the frame. A beveled toothed segment 17 is secured on the crank shaft, and gears into a beveled toothed pinion 18 secured on the lower end portion of the steering shaft 19. The shaft 19 is journaled in the steering post 20 secured to the frame, and is provided at its upper part with a hand-wheel 21 for operating it.

When a tractor is used for plowing, it is desirable to hold the front or steering ground wheels a little out of line with the line of draft, so that one of these ground wheels may run against one side of the furrow previously cut by the plow. It is also sometimes desirable to hold the ground wheels in line with the line of draft when the tractor is used on roads. In order to secure the steering mechanism in either of these preferred positions, so that the operator may not need to hold the hand-wheel all the time, a spring plate 24 is provided, and is secured at one end by rivets or bolts 25 to the frame 2 or any other stationary portion of the tractor. This spring plate has a laterally curved middle portion 26 having a hole 27 at its middle part which projects farthest from the plane of its main portion. A reinforcing plate 28 is secured to the concave side of the plate 24, and has a hole 29 which registers with the hole 27.

The crank 12 has a projection 30 which may be an extension of its pin 14 or a nut on the said pin, and this projection 30 is arranged to enter the holes 27 and 29, so that the steering mechanism is locked by the spring plate.

The position of the holes 27 and 29 fixes the position of the steering ground wheels. A catch 32 is provided, and is pivoted to a bracket 33 on the frame by a pin 34. When the spring plate 24 is pressed back by hand, out of engagement with the projection 30, it is engaged by a notch 35 on the catch, which retains it in an inoperative position. When the spring plate is released from the catch it springs forwardly, and the projection 30 bears against its convex surface and slips into the holes as soon as it comes in line with them.

This spring plate 24 may be conveniently pushed back by the foot of the operator to enable the steering mechanism to be adjusted by its hand-wheel 21, and treadle mechanism of any approved construction may be provided if the spring plate is not conveniently within reach of the foot of the operator.

What I claim is:

1. The combination, with the steering mechanism of a tractor provided with a crank mounted to oscillate in a vertical plane and provided with a lateral projection, of a spring plate secured to the tractor at one end and having a laterally projecting portion having an opening for engaging automatically with the said projection and thereby holding the said crank stationary.

2. The combination, with the steering mechanism of a tractor provided with a crank mounted to oscillate in a vertical plane and provided with a lateral projection, of a spring plate secured to the tractor at one end and having a laterally projecting portion having an opening for engaging automatically with the said projection and thereby holding the said crank stationary, and a retaining catch carried by the tractor and engaging with the free end portion of the spring plate when said plate is pressed back into an inoperative position.

3. The combination, with the steering mechanism of a tractor provided with a crank mounted to oscillate in a vertical plane and provided with a lateral projection, of a spring plate secured to the tractor at one end and having a laterally projecting portion having an opening for engaging automatically with the said projection and thereby holding the said crank stationary, and a reinforcing plate secured to one side of the said spring plate and having a hole which registers with the hole in the plate and also engages with the said projection.

In testimony whereof I have affixed my signature.

RALPH S. FARNSWORTH.